(No Model.)
J. N. HOWSER.
EAR CORN CUTTER.
No. 277,284. Patented May 8, 1883.
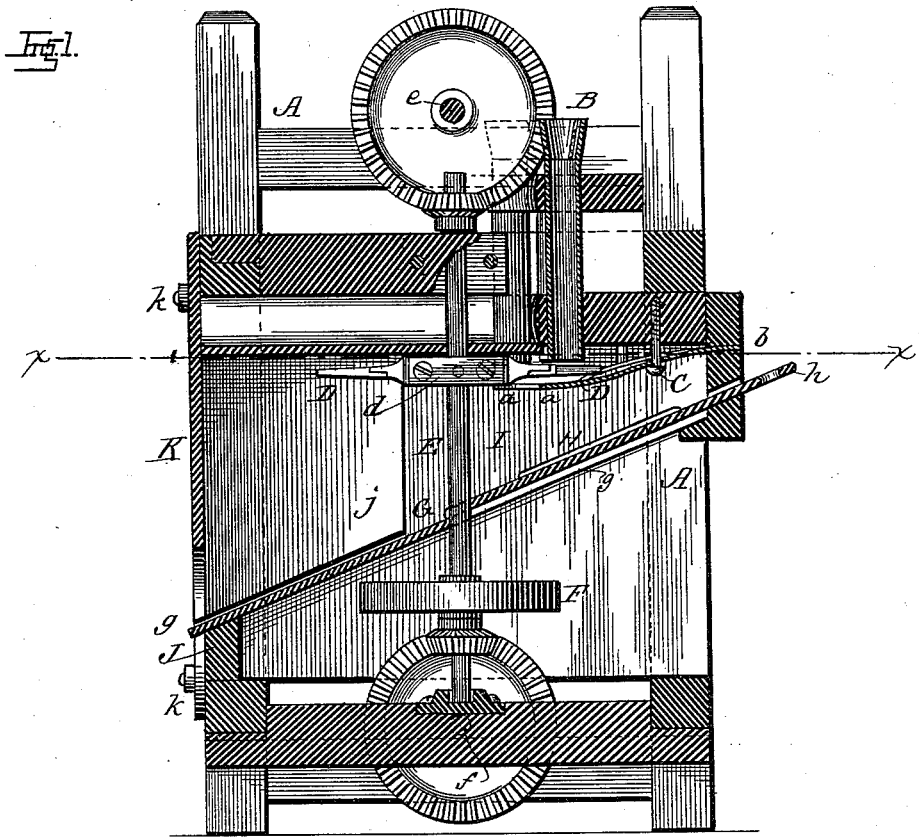
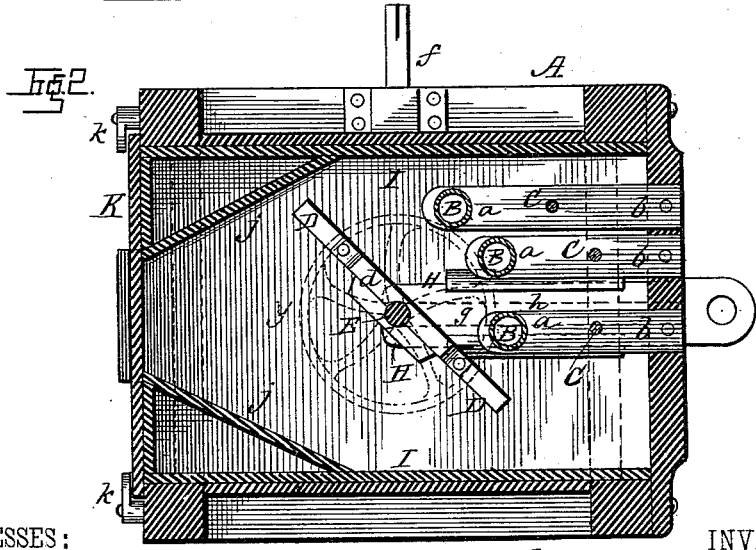
WITNESSES:
Fred. G. Dieterich.
W. X. Stevens.
INVENTOR.
Jonathan N. Howser
By Munn & Co.
ATTORNEYS.

UNITED STATES PATENT OFFICE.

JONATHAN N. HOWSER, OF SIDNEY, ILLINOIS.

EAR-CORN CUTTER.

SPECIFICATION forming part of Letters Patent No. 277,284, dated May 8, 1883.

Application filed March 7, 1883. (No model.)

*To all whom it may concern:*

Be it known that I, JONATHAN N. HOWSER, a citizen of the United States, residing at Sidney, in the county of Champaign and State of Illinois, have invented a new and useful Improvement in Ear-Corn Cutters, of which the following is a specification.

My invention relates to that class of ear-corn cutters in which revolving blades operate upon one or more ears of corn projecting from tubes, into which they are fed singly, to cut the same across the ear into slices; and it has for its object, first, to provide a yielding gage to permit the slice to recede as the thickness of the blade parts it from the ear; second, to make the same gage adjustable as to the thickness of the slice to be cut; and, third, to provide means whereby the cut corn shall be turned away from the lower gearing of the machine, and yet allow the blades and gages to be approached for any purpose required.

To this end my invention consists in the construction and combination of parts hereinafter described and claimed, reference being had to the accompanying drawings, in which—

Figure 1 is a transverse vertical section, part in elevation; and Fig. 2 is a horizontal section at $x$ $x$, Fig. 1.

A represents the frame or body of the machine.

B represents one or more tubes large enough to receive ears of corn, one at a time, in each tube, and allow them to descend of their own weight upon the stop or gage pieces $a$. These pieces are directly beneath the tubes B, and are springs secured to a portion of the frame at $b$, and supported midway upon adjusting-screws C, by means of which they may be set close up to the ends of the tubes, or at any required distance therefrom. By this adjustment the thickness of the slices cut will be regulated, as the ears of corn are cut close up to the tubes.

D represents two or more cutting-blades secured to the arms of a revolving head, $d$. These blades revolve in a horizontal plane close to the lower ends of the tubes B, and when one of them enters the ear of corn its thickness will cause the slice of corn to descend; and the gage $a$ is a spring to accommodate this descent and allow the blade to pass through and the slice to fall.

The head $d$ is secured upon an upright shaft, E, which is connected with the crank-shaft $e$ by beveled gears. By means of this crank and shaft the machine may be driven by hand. On the lower part of shaft E is a balance-wheel, F, which may serve as belt-wheel to drive the machine by machine-power.

$f$ is a shaft, connected to the main shaft E by beveled gears, to serve as a connection for horse-power. To keep the cut corn out of these lower gears, and to guide it into a receptacle, and to keep it from scattering in all directions, I provide a spout completely casing in the cutters and gages, and to get at these gages to set them and the cutters to sharpen them, I make this spout removable in a peculiar way, as follows:

G is the bottom of the spout, slanted to deliver the corn at $g$. This bottom board rests at its upper end on a cross-cleat and at its lower end on a cross-beam of the machine, and it is slotted at $g'$ to pass the main shaft to this position, and it is provided with cleats H and a sliding lid, $h$, to cover this slot.

I I are the two side boards of the spout, resting their lower edges on the cross-beams J of the frame, and provided internally with hopper-like abutments $j$ to narrow the delivery of the spout to proper limits. These abutments are secured to the side boards, I, which are removable by drawing them out of the frame on its spout side.

K is a removable cover, kept in place on the frame by four lipped buttons, $k$. This cover is outside the ends of the side boards, I, and keeps them in place, as well as to reduce the vertical plane of the outlet to the spout to the required size. By turning buttons $k$ the cover K may be removed; then the sides I may be drawn out; then lid $h$ may be drawn out and the bottom G removed.

What I claim as my invention is—

1. The combination, with a pipe or pipes to hold ears of corn, and a moving blade or blades to cut off the projecting ends of the ears, of a springing gage or gages, as and for the purpose specified.

2. The combination, with the tubes B and revolving blades D, of the gage-pieces a, secured to the frame at b, and the adjusting-screws C, as and for the purpose specified.

3. The combination, with the tubes and cutting-blades described, of an incasing-spout consisting of the slotted bottom G, provided with a sliding lid, h, the side boards, I I, provided with the abutments j, the cover K, and the buttons k, all as and for the purpose specified.

JONATHAN N. HOWSER.

Witnesses:
W. X. STEVENS,
SOLON C. KEMON.